United States Patent [19]

Robinson et al.

[11] 4,102,812

[45] Jul. 25, 1978

[54] PRODUCTION OF CARBON FROM COAL GRANULES PREPARED IN A FLUID ENERGY MILL

[75] Inventors: Michael Robinson, Healing; David Barry Mobbs, Grimsby; Kirit Talati, Immingham, all of England

[73] Assignee: Laporte Industries, Limited, Luton, England

[21] Appl. No.: 725,278

[22] Filed: Sep. 21, 1976

[30] Foreign Application Priority Data

Oct. 2, 1975 [GB] United Kingdom ............... 40231/75

[51] Int. Cl.² ...................... C01B 31/10; C01B 31/14; B01J 21/18
[52] U.S. Cl. ....................................... 252/421; 241/1; 252/445
[58] Field of Search ................ 252/421, 445; 423/449; 201/8, 9; 241/1

[56] References Cited

U.S. PATENT DOCUMENTS

| 2,550,390 | 4/1951 | Stephanoff | 241/1 |
| 3,539,467 | 11/1970 | Bozarth et al. | 201/9 |
| 3,843,559 | 10/1974 | Repik | 252/445 |
| 3,951,856 | 4/1976 | Repik | 252/421 |
| 3,976,597 | 8/1976 | Repik | 252/421 |

FOREIGN PATENT DOCUMENTS 692,773   6/1953   United Kingdom ..................... 201/8

Primary Examiner—P. E. Konopka
Attorney, Agent, or Firm—Larson, Taylor and Hinds

[57] ABSTRACT

Granular active carbon having satisfactory adsorbency and hardness characteristics and having a high proportion of its porosity in the below 2000 Å range is produced from granules prepared from coal fluid energy milled until not more than 1% of the particles have diameters above 38 microns. The coal has a low ash and high carbon content and may have a British Standard Swelling number from 2 to 7 although it is preferred for the volatile matter content of the coal to be not more than 40% on a dry ash free basis. The granules may be produced by compacting milled particles having a temperature of from 50° C to 250° C between unheated pressure rolls.

15 Claims, 2 Drawing Figures

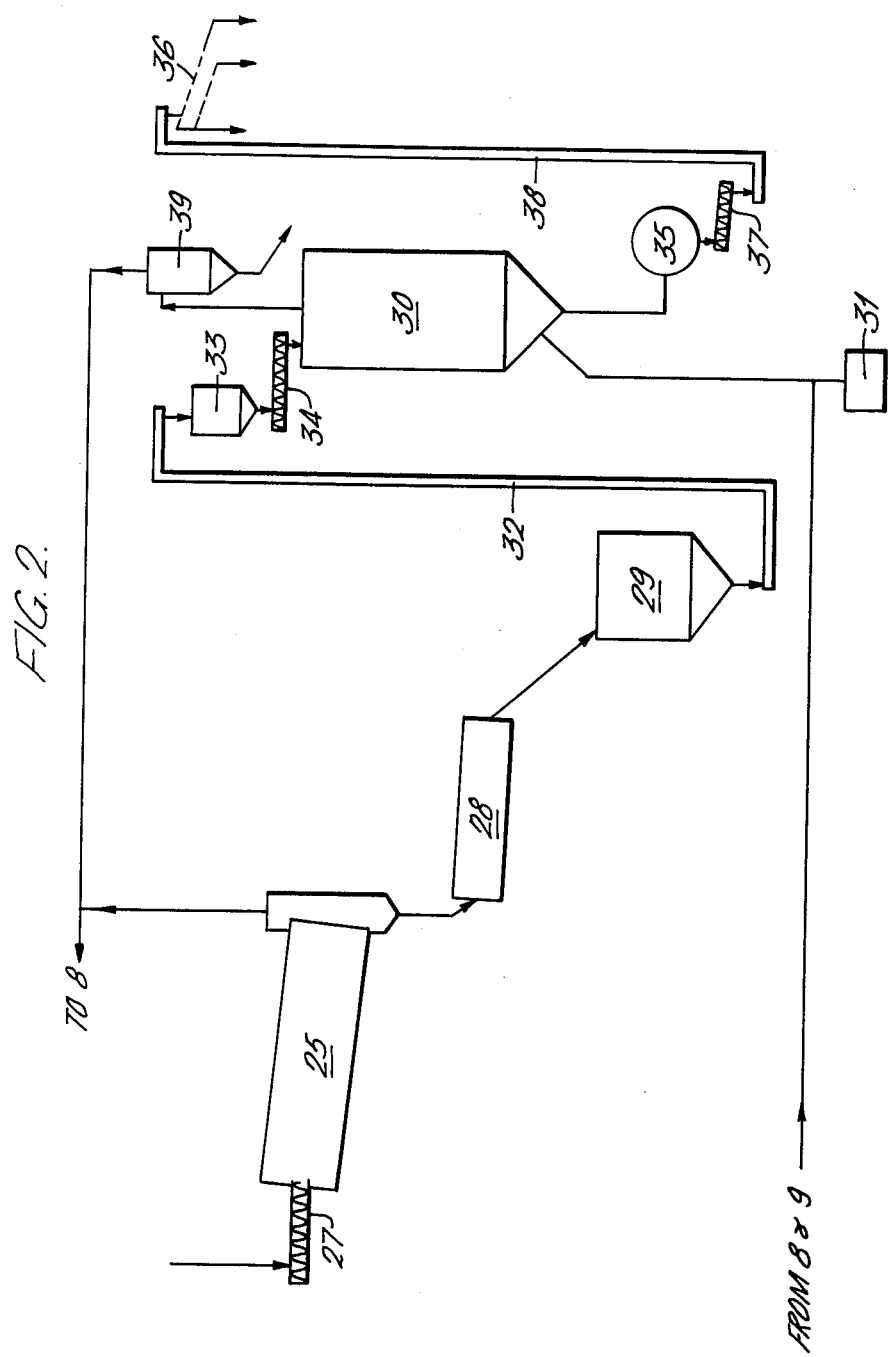

PRODUCTION OF CARBON FROM COAL GRANULES PREPARED IN A FLUID ENERGY MILL

This invention relates to a process for the production of carbon.

Active carbon is widely used as an adsorbent in gaseous and liquid systems. In at least some applications, it has been considered desirable for the active carbon to be in granular form. Granular active carbon, for example, lends itself to use in adsorption columns and like apparatus in which it may be desired to pass a gas or liquid through a bed of carbon. It is important that granular active carbon be able to stand up to the materials handling techniques used in such applications and in processes for regeneration of carbon after it has lost some or all of its adsorptive capacity in use. Granular active carbon should also have a high adsorptive capacity per unit bulk so that transport costs and capital equipment costs can be kept to a minimum.

U.S. Pat. No. 3,483,134 has, as a purpose, the preparation of an activated carbon having such properties. The process disclosed in U.S. Pat. No. 3,483,134 comprises pulverising bright banded bituminous coal under impact in the presence of a stream of air until the particles are of the following size range: at least 60% by weight through 200 mesh, at least 25% by weight through 325 mesh, introducing into the finely divided coal between 1% and 10%, by weight of the dry coal, of a cereal which will break down at a temperature between 220° F and the temperature of heat treating, regulating the moisture content of the finely divided coal to between 2.5% and 11% on the dry weight of the coal, moulding the finely divided coal into briquettes in a closed mould under a pressure as follows: where the volatile in the coal is above 38% by weight, in excess of 5000 psi, where the volatile in the coal is below 38% by weight, in excess of 10000 psi., heat treating the coal in thus moulded form at a temperature between 250° F and 800° F and not in excess of the temperature of agglomeration of the coal for a time of at least 4 hours, the coal and the cereal reacting exothermically during heat treatment, breaking down the briquettes into granules and activating the carbon granules.

U.S. Pat. No. 3,483,134 discloses that certain features of the above described process are particularly important to attain the desired result.

One feature is to use a bright banded bituminous coal which consists mainly of vitrain and clarain and which has a low ash content and a "high" volatiles content. 'High' is defined as being from 28 to 46% and most desirably from 39 to 42% on a moisture free basis by weight. A further feature is the incorporation into the coal, prior to reaction under heat, of potential chemical energy capability by shattering the macromolecules and forming free valencies. In order to do this it is not enough to grind by one of the accepted methods which will produce finely divided particles. Instead it is necessary to shatter the particles by impact and therefore it is essential that an impacting mill be employed. The preferred mill is a Raymond mill through which air is circulated. The air cools the particles, notwithstanding that much heat is generated by the impact, and blows the ground products out of the mill. The cereal additive performs a very important function in accelerating the heat treatment which, without the additive, would require at least 9 hours. To heat treat the coal even much less effectively without such an additive would require a considerably longer period of heat treatment than that necessary when carrying out the disclosed invention. The moulding must be carried out in a closed chamber mould and the resulting tablets are preferably next broken down to produce granules for the heat treatment described above.

The present invention relates to the production of a readily heat treated and activated carbon granules from coal without the use of many special features designed to improve the susceptibility of the granules to heat treatment and activation which is a feature of the prior art.

This invention comprises a process for the production of active carbon comprising milling coal in a fluid energy mill under a non-oxidising atmosphere until not more than 1% by weight of the particles so produced have diameters about 38 microns, compacting the particles to produce agglomerates, granulating the agglomerates and converting the resulting granules into active carbon.

Finely divided coal may combust spontaneously in contact with air as may the granules made therefrom, particularly if hot. It is, therefore, necessary to practice normal safety precautions associated with the handling of combustible materials such as the prevention of contact with air where necessary throughout the operation of this invention.

While it is contemplated that the fluid energy milling step of the present invention my be conducted in the presence of any non-oxidising atmosphere suitable to prevent combustion, for example nitrogen or an inert gas, it has been found particularly advantageous to mill under an atmosphere of superheated steam. The temperature of the superheated steam is preferably from 150° to 400° C and most preferably from 250° to 350° C. The fluid energy mill used may be of any of those commercially available. Examples of suitable mills which operate by means of peripheral jets about the diameter of a grinding chamber are the Micronizer, the Jet Pulverizer, the Reductionizer or the Jet-O-Mizer. An example of a suitable mill operating by the action of two opposing jets of fluid is the Majac. (The words Micronizer, Jet Pulverizer, Reductionizer, Jet-O-Mixer and Majac are Trade Marks).

The fluid energy mill may be controlled to produce the degree of fineness required. Preferably the mill is controlled so that less than 10%, and particularly preferably not more than 1%, by weight of the particles, have diameters below 1 micron. Particularly preferably from 90 to 99% by weight of the particles of the coal are ground to a particle diameter of not below 1 micron and not above 10 microns. The particle distribution of the milled coal may be monitored by the use of British Standard Sieves except for the finest sizes which may be monitored by an electronic device such as a Coulter (Trade Mark) Counter.

After the coal has been ground it is compacted to produce agglomerates. However, it is particularly advantageous to avoid the use of binders and to form the agglomerates utilising a medium to highly caking coal, under the influence merely of heat and pressure. This may be accomplished by compacting the fluid energy milled particles by means of pressure rolls. Pressure rolls are a very suitable means of applying the pressure. If unheated pressure rolls are of relatively simple construction and low capital cost. Such rolls may comprise at least one pair of rollers arranged to rotate about their axes in opposite senses and with their circumferences descending towards a line of contact between them.

British coals are typical of the range of coals suitable for use in the present invention:

|  | WOOLLEY (BARNSLEY) | MARKHAM (DONCASTER) | WOLSTANTON (NEWCASTLE-UNDER-LYNE) | BERSHAM (WREXHAM) | CLIPSTONE (MANSFIELD) |
|---|---|---|---|---|---|
| $H_2O$ % wt. | 9.0 | 10 | 9.3 | 8.7 | 10.0 |
| Swelling No. (BS) | 6½ | 2 | 7 | 7 | 6 |
| Volatile Matter % (Wt. dry ash-free) | 34.9 | 36.0 | 34.7 | 37.0 | 37.3 |
| Fixed Carbon % wt. | 59.7 | 59.0 | 56.6 | 53.8 | 53.1 |
| Ash % wt. | 3.5 | 3.5 | 4.0 | 5.5 | 5.2 |
| Sulphur % wt. | 1.5 | 1.5 | 1.33 | 1.0 | 1.0 |

The rollers may be urged together by means of hydraulic rams. To avoid uneven pressure the rollers must be of great rigidity and therefore usually consist of solid cylinders up to a foot or more in diameter and up to several feet in length. It is not easily practicable to heat these rollers evenly over their rolling surfaces without considerable complexity of construction.

Where the coal particles are hot it has been found possible to use unheated pressure rolls. It is, therefore, a further and advantageous feature of this invention to recover the milled particles from a hot gaseous effluent from the fluid energy mill and to pass the recovered particles through unheated pressure rolls. Preferably the temperature of the particles is at least 50° C and not more than 250° C while being passed through the pressure rolls. Preferably the operation of the rollers is controlled to exert a pressure of from at least 580 Kg and preferably from 580 Kg to 714 Kg, per cm of roll length, between the rolls. Higher forces may be used if desired although without any marked improvement in the properties of the final product.

The agglomerated coal, whether in tablet form from a tabletting press, or as briquettes, or as flakes, is converted to granules which are preferably particles having largest diameters not less than 0.25 mm and not greater than 3.0 mm. A preferred apparatus for use in granulation is one which will produce brittle fractures resulting in minimal dust formation, such as a suitable cutter.

In common with many other processes for the production of active carbon using coal as a raw material it is preferred that the coal used should have a low-ash content, which may preferably be up to 6% on a dry weight basis, and a high fixed carbon content, which is preferably at least 50%, and if desired up to 65%, on a dry weight basis. A particular feature of the present invention however, is that it is possible to utilise coal of only moderate or even weakly caking properties as shown by its British Standard Swelling Number in contrast to the high caking coals usually required for such processes. Highly caking coals are, of course, also utilisable. Preferably the coal used has a BS Swelling Number of from 2 to 7. However, it may not be desirable to use coal having very high swelling numbers because of their high content of volatile matter. The heat treatment removes volatile matter and tends to produce a low density carbon having some undesirably large pores which may contribute to weakness in the carbon granules if the volatile matter content of the coal has been high. It may therefore be preferred to use coal having a volatile matter of up to 40%, for example from 25 to 40% on a dry ash-free weight basis. The following The granules produced by the present invention are converted into active carbon by a three stage treatment comprising oxidation, carbonisation, comprising progressively raising the temperature of the oxidised granules to reduce the volatile matter content thereof, and activation, comprising heating at an elevated temperature in the presence of an activating gas. The oxidation process may be conducted in a rotary kiln or in a multiple hearth furnace but is most effectively conducted in a fluidised bed utilising air as the fluidising medium. When using a fluidised bed the oxidation of the granules is preferably conducted at a temperature of from 150° to 250° C, for example from 180° to 220° C, for a period of, preferably, from 30 minutes to 3 hours. This treatment renders the coal non-swelling and non-caking and prevents if from fusing during subsequent processing. The oxidation of highly caking coal can be difficult but it has been found that even highly caking coals can be oxidised in the above temperature range when it is in the form of granules manufactured according to the present invention. As a demonstration of this a sample of the Clipstone coal described above was fluid energy milled using superheated steam according to this invention, was agglomerated using unheated pressure rolls, was reduced to 1.0 mm granules, and was oxidised in a fluidising bed at 200° C. After 1 hour of oxidation the coal had been rendered non-swelling and non caking.

The carbonisation stage is preferably accomplished by progressively raising the temperature of the oxidised granules to at least 800° C and preferably to 950° C, suitably in a multiple hearth furnace or a rotary kiln. Preferably, in the operation of this invention the temperature is increased relatively slowly, that is to say, preferably, at a rate not above 150° C per minute but, particularly preferably, not above 100° C per minute. There is no lower limit to the heating rate although the use of a very slow rate will affect the economics of the process. We find a particularly suitable heating rate is 50° C per minute. This allows the uniform release of volatile matter so as to create a uniform pore structure throughout the granules. Preferably the temperature of the oxidised granules is raised from 400° to 950° C at a rate not above 100° C per minute.

The activation stage may comprise heating at an elevated temperature in the presence of an activating gas comprising steam, or carbon dioxide, or admixtures of steam and carbon dioxide. A suitable activating gas may be obtained from the stoichiometric combustion of fuel oil or gas. Nitrogen may be used in addition to the activating gas if required. The activation step may be conducted either in a fixed bed or in a fluidised bed although the latter is preferred since it involves a lesser residence time. The activation step may be conducted in the temperature range of 600° to 1000° C and, preferably, in the range of from 850° to 950° C. Temperatures above 1000° C lead to increased graphitisation and to a progressive reduction in the volume of the micropores. When conducting a fluidised bed activation the activating gas may be used as the fluidising medium. The ratio of activating/fluidising gas to the weight of coal in the bed is an important parameter and may be optimised to suit both a particular residence time and to control, to an extent, the pore size distribution in the final product. Preferably from 0.2 to 2.0 kg of activating gas is used per kg of original coal feed per hour of activation. By original coal feed we mean the weight of coal milled. It is a particularly advantageous feature of this invention to fluid energy mill the coal in a steam atmosphere in that the effluent steam from the fluid energy mill may be used in the activation process if its temperature is boosted to a suitable level. The duration of activation step is preferably from 1 to 3 hours when a fluidised bed is used. Where a fixed bed is used, the duration of the activation step may be from 2 to 6 hours.

The present invention may produce granules which are particularly easily heat treated and activated and which result in a dense active carbon which is resistant to mechanical degradation, which shows a high degree of activity as an absorbent and which contains few or no macropores above 10,000 angstroms while retaining a high proportion of porosity in the 0 to 2,000 angstrom range.

The apparent bulk density of a sample of the material taken after each stage of a process according to the invention was as follows:

After compaction: 1.35 g/cc
After oxidation: 1.35 g/cc
After carbonisation: 0.90 g/cc
After activation: 0.66 g/cc The method used to measure apparent bulk density is as follows:

A weighed amount of carbon ($w_s$) is introduced into a calibrated pyknometer (Vol. Vp) at constant temperature and mercury is added (density $d_R$) to the reference mark. The weight ($w_F$) of the pyknometer and contents is then noted. Care must be taken to ensure the carbon particles are surrounded by mercury and excess air is not entrained. The apparent density if found from the expression $$dR Ws/V_p d_R + w_p + w_s - w_F$$

(where $w_p$ = wt. of pyknometer).

A plant for the manufacture of active carbon from coal including apparatus which may be utilised in the production of granules according to this invention is now described with reference to the accompanying drawings.

FIG. 2 is a block diagram of the remaining portion of the plant.

Figure 1:
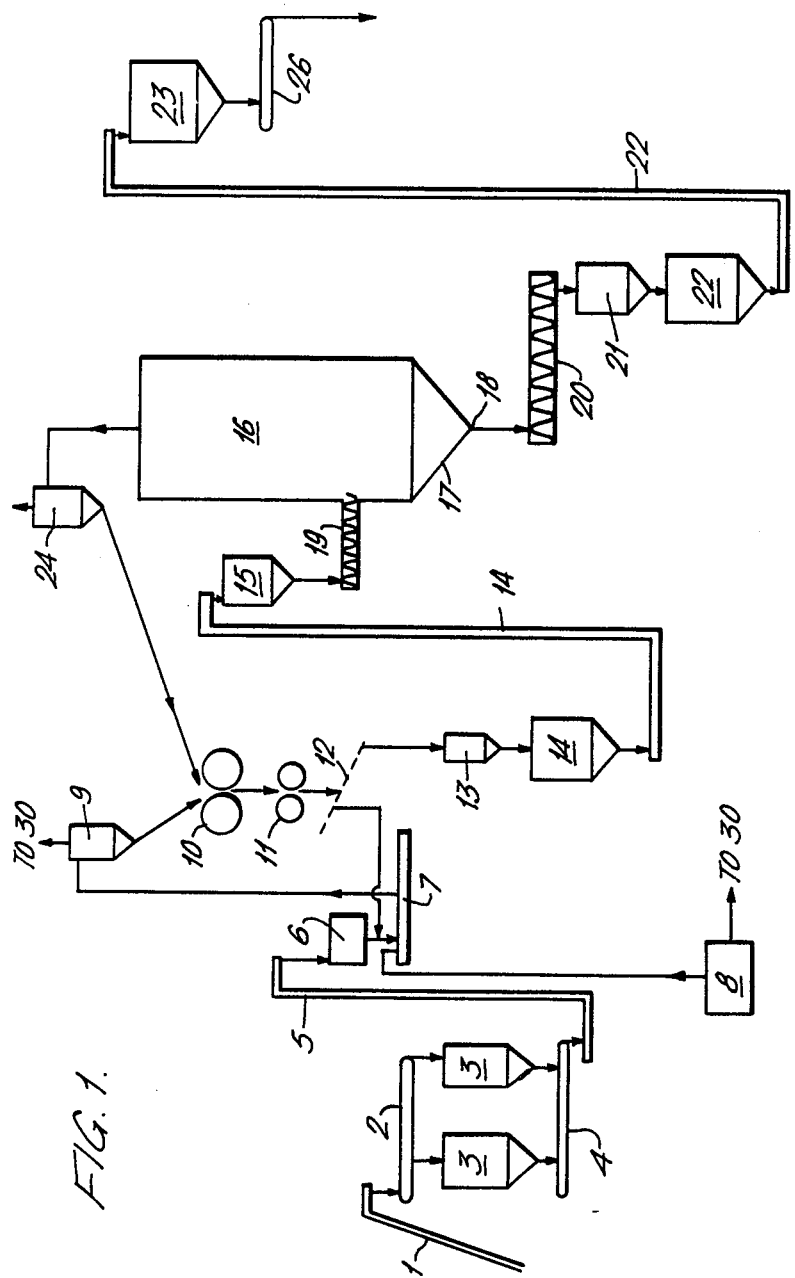
FIG. 1 is a block diagram of the portion of the plant up to and including the oxidation stage.

The plant contains a conventional coal mill 6 having hardened steel crushing surfaces and capable of grinding the coal into particles not more than about 2 mm in diameter. The coal mill 6 is arranged to be serviced with coal by a mild steel elevator 1, a rubber belt conveyor 2, the two storage hoppers 3, a further rubber belt conveyor 4 and a pocket belt elevator 5. A Micronizer fluid energy mill 7 is arranged to receive the coal particles from the coal mill. The Micronizer is arranged to operate using superheated steam from a waste heat boiler 8.

A cyclone 9 is provided to separate the coal particles in the effluent from the fluid energy mill and the unheated pressure rolls 10 are positioned so as to receive these particles direct from the cyclone. The pressure rolls are made of mild steel. The rotary cutters 11, positioned so as to receive the flakes issuing from the pressure rolls have hardened steel blades and are capable of cutting the flakes into granules. The fines resulting from the action of the rotary cutters may be separated by means of a screen 12 for recycle to the fluid energy mill and the granules passed via the surge hopper 13 and the pneumatic elevator 14 to the hopper 15 for storage while awaiting oxidation.

The means for oxidising the granules to render them non-caking comprises fluidised bed batch reactor 16 lined with carbon steel and provided internally with water sprays for temperature control. The oxidiser is arranged to operate using air as the fluidising gas provided through the inlet 17 and the product may be removed by means of duct 18. The granules are introduced into the oxidiser by means of screw feeder 19. The oxidised granules may be removed via the water cooled screw conveyor 20 to the surge hopper 21 and elevated in a pneumatic elevator 22 to hopper 23 for storage while awaiting carbonisation. The effluent fluidising gas from the oxidiser is stripped of entrained fines in the cyclone 24 whence they are recycled to the pressure rolls. From this point until after the carbonised granules are cooled the plant is sealed to prevent ingress of air which could result in spontaneous combustion. The gases from cyclone 24 are vented.

Carbonisation is conducted in the rotary kiln 25 which is arranged to be operated at an oxygen concentration of not more than 2% to prevent combustion. The granules are passed into the kiln via the rubber belt conveyor 26 and the screw feeder 27. The volatile matter from the rotary kiln is removed to fuel the waste heat reboiler 8 and the carbonised granules are passed to the cooler 27 to prevent combustion and are retained in the storage bin 28 awaiting activation.

The activator comprises fluidised bed vessel 30 arranged for batch operation. The fluidising gas is a mixture of steam recovered from the fluid energy mill by means of the cyclone 9 and combustion gases from an oil burner 31 operating without excess air. The carbonised granules are passed into the activator by means of pneumatic conveyor 32, hopper 33 and screw feeder 34. The activated granules are passed to cooler 35 before being passed to screen 36 by means of the screw feeder 37 and the pneumatic elevator 38. Screen 36 separates appropriate size fractions as required. The waste gases from the activator are passed through cyclone 39 whence they are passed to waste heat reboiler 8 the fines being recovered.

The hardness of the granulated active carbon produced by the present invention may be measured by the following method. The basic method is that disclosed in the Encyclopaedia of Industrial Chemical Analysis edited by Snell & Ettre 1969, Vol. 8 pages 139 onwards, wherein a sample of carbon is retained in a sieve pan with steel balls of different diameters and is subjected to mechanical degradation for 20 minutes using a RO-tap sieve shaker. The valve of hardness is obtained by measuring the weight fractions of both initial and tested samples, calculating the weight mean particle diameter for each, and expressing the ratio of final and initial weight mean diameters as a percentage. This test was modified to give a result in which the fraction of tested material greater than 105 microns is expressed as a percentage of the total sample weight.

To determine the pore size distribution of the active carbon product mercury penetration porosimetry may be used to determine the quantity of pores greater than 400 angstroms diameter and, to determine the distribution of finer pore sizes, a suitable gas adsorption apparatus of the kind used to measure BET adsorption isotherms may be used.

The effectiveness of active carbon as an adsorbent may be judged by reference to its Iodine Number and/or its Methylene Blue Number.

The Iodine Number of a carbon adsorbent may be determined as follows. Prepare standard 0.1 N solutions of iodine and of sodium thiosulphate. Place 1 g of carbon ground to 325 mesh (Tyler) in a stoppered flask. Add 10 ml 5% Hcl to the flask, swirl, boil for 1 minute and cool to room temperature. Add 100 ml of the iodine solution, stopper, shaker for 30 seconds and filter on a Whatman No. 12 filter paper discarding the first portion of the filtrate. Pipette off 50 ml of the filtrate and titrate with the sodium thiosulphate solution using starch as an indicator. The titre should be between 4 and 16. If outside these limits the sample weight should be adjusted accordingly. The filtrate normality is $$\frac{\text{mls thiosulphate solution} \times 0.1 N}{50}$$

Depending on the filtrate normality a factor is selected as follows:

| Normality | Factor |
|---|---|
| 0.008 | 1.16 |
| 0.01 | 1.12 |
| 0.012 | 1.09 |
| 0.014 | 1.06 |
| 0.016 | 1.04 |
| 0.018 | 1.02 |
| 0.20 | 1.00 |
| 0.22 | 0.98 |
| 0.24 | 0.97 |
| 0.26 | 0.96 |
| 0.28 | 0.95 |
| 0.30 | 0.94 |
| 0.32 | 0.93 |

The Iodine Number is F × (mg of $I_2$ at outset − mg $I_2$ determined by titration).

The Methylene Blue Number of a carbon adsorbent may be determined as follows:

Place 1 g of carbon ground to 325 mesh (Tyler) in a flask Add 0.1% aqueous methylene blue solution from a burette, 1 ml at a time, stirring for one minute after each addition. At the end of each 2 minute interval observe the residual colour of the carbon suspension by spotting on a plate or filter paper. If any blue colour remains the end point has been reached. Results are recorded as milligrams of methylene blue adsorbed per 1 gram of carbon.

The invention is illustrated by the following example 1 in which the granules produced according to a preferred embodiment of the invention are processed on a laboratory scale into granular active carbon the properties of which are examined by the tests described above. Examples 2 and 3 are not according to the invention and are inserted for comparative purposes. Example 4 is according to the invention.

EXAMPLE 1

The Coal used was the Woolley Coal described previously. The coal as received was dried and crushed to below 1 mm size and fed to a fluid energy mill (Micronizer) operating under the following conditions:

| Micronizer diameter | 5.0 cm (6 nozzles - ¼ mm diameter) |
|---|---|
| Feed Rate | 3 kg/hr |
| Feed Size | less than 1 mm |
| Ring Pressure | 25 psi |
| Injection Pressure | 150 psi |
| Steam Temp. | 300° C |
| Product Temp. | 190° C |
| Product Size | ≧38 micron 0% |
| | <38 micron but >10 micron 1% |
| | 3-10 micron 91% |
| | <3 micron 8% |

The product was fed directly on to unheated plain faced 6 inch diameter rolls operating at 2 rpm. A force of 3500 lb/linear inch of roll was applied to the rolls. The product was obtained as flakes, any unbonded coal being returned to the fluid energy mill and recycled. The flakes were then broken to produce granules in the size range of 0.3 to 3.0 mm. The granules were rendered non-agglomerating by heat treatment comprising oxidation in air using a 10 cm diameter fluidised bed reactor. Oxidation was completed in the 10 cm diameter reactor in 1 hour operating at 200° C with a preheated air flow of two times that required to just fluidise the particles. Carbonisation of the oxidised granules was achieved by heating in rotary kiln at a rate of 50° C/minute over the range 400°-900° C which served to devolatilise the coal and increase product hardness. The carbonised granules were activated in a fluidised bed reactor using a fluidising gas velocity twice that required just to fluidise the particles and a flow of steam at a rate of 0.8 kg steam per kg of original coal per hour of activation as the fluidising gas. After 2 hours at 950° C an activated carbon of suitable pore size distribution was obtained. The final hardness of the product was 83% and no macropores in excess of 30,000 Angstrom units diameter were observed. The adsorption properties of the product were as follows:

Iodine No.1300mg $I_2$/g carbon

Methylene Blue No. 351 mg Methylene Blue/g Carbon

The pore size distribution of the product was as follows (as % of total porosity)

| >30,000 Angst. | None |
|---|---|
| 30,000 − 20,000 | 1.5 % |
| 20,000 − 10,000 | 9 % |
| 10,000 − 2,000 | 22 % |
| 2,000 − 1,000 | 5 % |
| 1,000 − 400 | 10 % |
| 400 − 0 | 52.5 % |

In comparison the following commercial activated carbons were found to have the following properties:

| | Hardness % | Iodine No. | Methylene Blue No. |
|---|---|---|---|
| Chemivron Filtrasorb 200 | 65 | 1000 | 169 |
| Westvaco WV-W | 70 | 850 | 261 |

EXAMPLES 2 TO 4

Markham Coal as identified in the table on page 8 of the specification was pulverised in a Mikropulveriser (Trade Mark) impact mill and sieved on a 45 micron sieve. The Coulter Counter (Trade Mark) analysis of the material passing through the sieve showed:
below 38 microns: 65%
below 10 microns: 10%

This material was pelleted cold in an unheated ram press without binders at a pressure of 700 Kg/sq.cm. The resulting pellets were cut to a 1-4 mm size and oxidised with air in a fluidised bed at a temperature of 200° C for 1 hour. The oxidised coal was carbonised and activated as disclosed in Example 1 and the resulting active carbon product had the properties described in the following Table in the column headed Example 2. The Example was repeated with the sole modification that the ram press operated at a temperature of 200° C. The properties of the resulting active carbon product are described in the column of the following Table headed Example 3.

The same coal was fluid energy milled as disclosed in Example 1 to give a product of which 100% of the particles were below 38 microns in diameter and of which more than 90% of the particles were from 3 to 10 microns in diameter. The milled coal was then treated as in Example 2 and the properties of the active carbon product are described in the column of the following Table headed Example 4.

TABLE

|  | Example 2 | Example 3 | Example 4 |
| --- | --- | --- | --- |
| Iodine No. | 735 | 405 | 960 |
| Methylene Blue No. | 125 | — | 169 |
| Hardness % | 46 | — | 48 |
| Pore size distribution % |  |  |  |
| >40,000 Å | 2 | — | 0 |
| >20,000 - 40,000 Å | 7 | — | 1 |
| 2,000 - 20,000 Å | 27 | — | 22.5 |
| 1,000 - <2,000 Å | 4 | — | 3 |
| 400 - <1,000 Å | 4 | — | 1.5 |
| <400 Å | 27 | — | 44 |
| out of a total porosity % of | 71 | — | 72 |

What we claim is:

1. A process for the production of active carbon comprising the steps of
   a. milling a medium to high caking coal in a superheated steam atmosphere in a fluid energy mill to produce a milled product in which less than 10% by weight of the particles have diameters below 1 microns and at least 90% by weight have diameters not below 1 micron and not above 10 microns and not more than 1% by weight of the particles have diameters above 38 microns
   b. compacting the product from the milling step, in the absence of binders, while the temperature of the product is at least 50° C and not more than 250° C to produce agglomerates
   c. reducing the agglomerates in size to produce granules
   d. oxidising the granules to a non-swelling non-caking form
   e. carbonising the oxidised granules
   f. steam activating the carbonised granules
   g. recovering the resulting active carbon.

2. A process as claimed in claim 1 wherein the coal has an ash content up to 6% on a dry weight basis and a fixed carbon content of at least 50% on a dry weight basis.

3. A process as claimed in claim 2 wherein the coal has a volatile matter content of up to 40% on a dry ash-free weight basis.

4. A process as claimed in claim 1 wherein the steam has a temperature of from 150° to 400° C.

5. a process as claimed in claim 1 wherein the coal is milled in a fluid energy mill so that from 90% to 99% by weight of the particles produced have diameters not below 1 micron and not above 10 microns.

6. A process as claimed in claim 1 wherein the particles produced by milling are formed into agglomerates by passing them through pressure rolls.

7. A process as claimed in claim 1 wherein the agglomerates are formed into granules by means of a device capable of producing brittle fractures.

8. A process as claimed in claim 7 wherein the granules comprise particles having their largest dimensions not less than 0.25 mm and not greater than 3.0 mm.

9. A process as claimed in claim 1 wherein oxidation of the granules is conducted in a fluidised bed at a temperature of from 150° to 300° C for a period of from 30 minutes to 3 hours using a combined fluidising and oxidising medium comprising air.

10. A process as claimed in claim 9 wherein the temperature of the oxidised granules is raised at a rate not above 100° C per minute to at least 800° C to achieve carbonisation.

11. A process as claimed in claim 10 wherein the temperature of the oxidised granules is raised at a rate of not above 100° C per minute from 400° to 950° C.

12. A process as claimed in claim 10 wherein the carbonised granules are activated by heating at a temperature of from 600° to 1000° C in the presence of an activating gas comprising steam, carbon dioxide or mixtures thereof.

13. A process as claimed in claim 1 wherein the carbonised granules are activated by heating at a temperature of from 600° to 1000° C in the presence of an activating gas comprising the stoichiometric combustion product of a fuel oil or gas.

14. A process as claimed in claim 1 wherein the steam is present in a quantity of from 0.2 to 2 Kg per Kg coal milled.

15. A process as claimed in claim 14 wherein the duration of the activation stage is from 1 to 3 hours.

* * * * *